(12) United States Patent
Bhamidipati et al.

(10) Patent No.: US 8,266,149 B2
(45) Date of Patent: Sep. 11, 2012

(54) CLUSTERING WITH SIMILARITY-ADJUSTED ENTROPY

(75) Inventors: Narayan L. Bhamidipati, Karnataka (IN); Nagaraj Kota, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 90 days.

(21) Appl. No.: 12/965,801

(22) Filed: Dec. 10, 2010

(65) Prior Publication Data

US 2012/0150860 A1 Jun. 14, 2012

(51) Int. Cl.
*G06F 7/00* (2006.01)
*G06F 17/30* (2006.01)

(52) U.S. Cl. ...................................................... 707/740

(58) Field of Classification Search .................... None
See application file for complete search history.

(56) References Cited

U.S. PATENT DOCUMENTS

| | | | |
|---|---|---|---|
| 7,376,643 B2 * | 5/2008 | Zeng et al. ............................. | 1/1 |
| 7,860,741 B1 * | 12/2010 | Robinson ...................... | 705/7.31 |
| 2009/0240358 A1 * | 9/2009 | Ogasawara et al. ............. | 700/94 |

OTHER PUBLICATIONS

Forrest B. Brown, "On the use of Shannon entropy of the fission distribution for assessing convergence of Monte Carlo criticality calculations", PHYSOR-2006, 5 pages.*
Ahmed Mohammed Hassan, "A probabilistic relaxation framework for learning Bayesian network structures from data", Cairo university 2007, 101 pages.*

* cited by examiner

*Primary Examiner* — Uyen T. Le
(74) *Attorney, Agent, or Firm* — Martine Penilla Group, LLP (57) ABSTRACT

Data-mining software initializes a loop by (a) assigning the messages in an online discussion on a website to a single logical cluster that is one of a group of logical clusters and (b) determining a measure of similarity-adjusted entropy for the group of logical clusters. Then the data-mining software randomly reassigns one of the messages to another logical cluster that is randomly selected from the group of logical clusters and again determines a measure of the similarity-adjusted entropy for the group of logical clusters. If the subsequent measure of similarity-adjusted entropy is greater than or equal to the earlier measure of similarity-adjusted entropy, the data-mining software undoes the reassignment. If the subsequent measure of similarity-adjusted entropy is less than the earlier measure of similarity-adjusted entropy, the data-mining software replaces the earlier measure with the subsequent measure. The data-mining software repeats the operations of the loop until convergence is reached.

20 Claims, 13 Drawing Sheets

Shannon's Entropy 301

$$H(p_1, p_2, \ldots, p_k) = -\sum_{i=1}^{k} p_i \log p_i$$

Similarity-Adjusted Entropy 302

$$G(p_1, p_2, \ldots, p_k; A) = -\sum_{i=1}^{k} p_i \log \left( \sum_{j=1}^{k} a_{ij} p_j \right)$$

Similarity Matrix 303

$$\begin{bmatrix} A_1 & 0 \\ 0 & A_2 \end{bmatrix}$$

Figure 3A

System Entropy for Clusters 304

$$\sum_{i=1}^{k} p_i H(C_i) = -\sum_{i=1}^{k} \frac{n_i}{n} \sum_{j=1}^{m} \frac{n_{ij}}{n_i} \log \frac{n_{ij}}{n_i}$$

305

$$= -\frac{1}{n} \sum_{i=1}^{k} \left( \sum_{j=1}^{m} n_{ij} \log n_{ij} - n_i \log n_i \right)$$

System Entropy During Processing
Using Monte Carlo Method 306

$$-\frac{1}{n} \left( pf_1 \log(pf_1) + (1-p)f_1 \log((1-p)f_1) \right.$$

$$+ \sum_{i=1}^{2}\sum_{j=2}^{m} n_{ij} \log n_{ij} - \left( pf_1 + \sum_{j=2}^{m} n_{1j} \right) \log \left( pf_1 + \sum_{j=2}^{m} n_{1j} \right)$$

$$\left. - \left( (1-p)f_1 + \sum_{j=2}^{m} n_{2j} \right) \log \left( (1-p)f_1 + \sum_{j=2}^{m} n_{2j} \right) \right)$$

CLUSTERING WITH SIMILARITY-ADJUSTED ENTROPY

BACKGROUND

Clustering is a division of data into groups of similar objects and can be thought of as grouping objects in such a way that the diversity within each cluster is minimized. In the case of numeric data, one can perform such a grouping by computing the distance or similarity between objects (points or vectors) and/or clusters. However, categorical (or nominal) data demands special treatment as the distance between objects is not always computable.

A common approach to clustering categorical data is to assume that there is no similarity between the features of an object and that all the features of an object are equally important. This assumption allows the entropy of the feature proportions in each cluster to be used as a criterion to segregate objects based on feature counts.

However, in practice, features of objects are often similar to each other. Existing methods deal with this by explicitly merging the similar features. However, the merging of features introduces other problems such as the imposition of relatively arbitrary thresholds in order to decide which features are similar enough to warrant being treated as identical. Also, the merging of features can result in a chaining effect, where a pair of features, say features 1 and 3, are merged when they are not similar, as a result of the merging of features 1 and 3 and features 2 and 3.

SUMMARY

In a first example embodiment, a processor-executed method is described for the clustering of the authors of messages in an online discussion on a website. Each message is associated with an author, a category in a domain, and a rating based on feedback from readers of the message. According to the method, data-mining software initializes the method by (a) assigning the messages to a single logical cluster that is one of a group of logical clusters and (b) determining a measure of similarity-adjusted entropy for the group of logical clusters. The similarity-adjusted entropy is based at least in part on the category and the rating associated with each of the messages. Then the data-mining software randomly reassigns one of the messages to another logical cluster that is randomly selected from the group of logical clusters. Following the reassignment, the data-mining software again determines a measure of the similarity-adjusted entropy for the group of logical clusters. If the subsequent measure of similarity-adjusted entropy is greater than or equal to the earlier measure of similarity-adjusted entropy, the data-mining software undoes the reassignment. If the subsequent measure of similarity-adjusted entropy is less than the earlier measure of similarity-adjusted entropy, the data-mining software replaces the earlier measure with the subsequent measure. Then the data-mining software repeats all of the operations of the method following initialization until the operations converge.

In a second example embodiment, an apparatus is described, namely, a computer-readable storage medium which persistently stores a program that clusters the authors of messages in an online discussion on a website. Each message is associated with an author, a category in a domain, and a rating based on feedback from readers of the message. When executed, the program initializes a loop by (a) assigning the messages to a single logical cluster that is one of a group of logical clusters and (b) determining a measure of similarity-adjusted entropy for the group of logical clusters. The similarity-adjusted entropy is based at least in part on the category and the rating associated with each of the messages. The program then randomly reassigns one of the messages to another logical cluster that is randomly selected from the group of logical clusters. Following the reassignment, the program again determines a measure of the similarity-adjusted entropy for the group of logical clusters. If the subsequent measure of similarity-adjusted entropy is greater than or equal to the earlier measure of similarity-adjusted entropy, the data-mining software undoes the reassignment. If the subsequent measure of similarity-adjusted entropy is less than the earlier measure of similarity-adjusted entropy, the data-mining software replaces the earlier measure with the subsequent measure. The program then repeats all of the operations in the loop until the operations converge.

In a third example embodiment, a processor-executed method is described for the clustering of the authors of messages in an online discussion on a website. Each message is associated with an author, a category in a domain, and a rating based on feedback from readers of the message. According to the method, data-mining software uses Monte Carlo experiments to assign the messages to a group of logical clusters until a convergence is reached as to a low similarity-adjusted entropy. The similarity-adjusted entropy is based at least in part on the domain category and the rating. Then the data-mining software displays, in a graphical user interface, each of the authors whose messages are assigned to the cluster associated with the highest ratings in each of the categories.

Other aspects and advantages of the invention will become apparent from the following detailed description, taken in conjunction with the accompanying drawings, which illustrate by way of example the principles of the invention.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
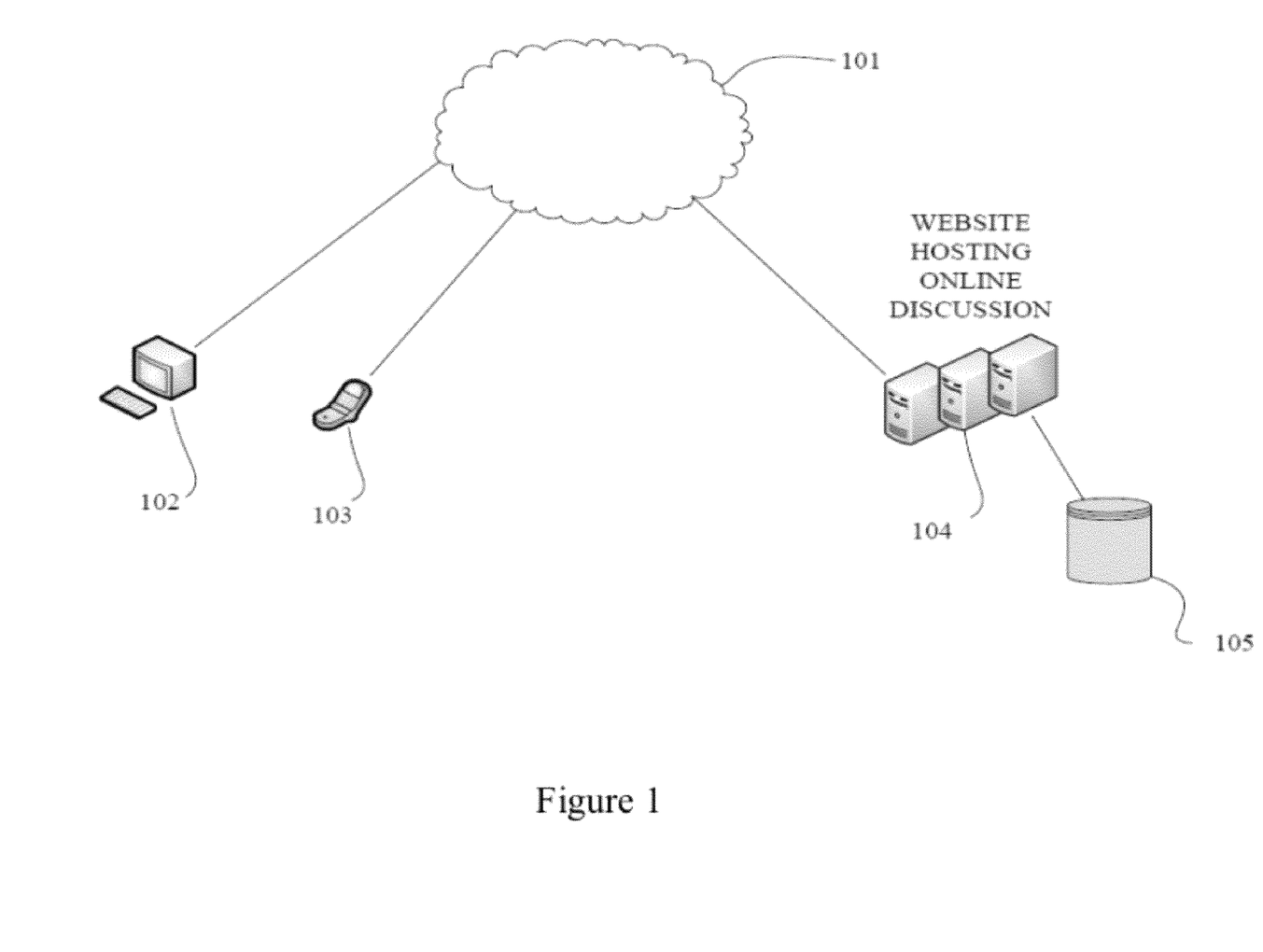
FIG. 1 is a simplified network diagram that illustrates a website hosting an online discussion, in accordance with an example embodiment.

FIG. 1 is a simplified network diagram that illustrates a website hosting an online discussion, in accordance with an example embodiment. As depicted in this figure, a personal computer 102 (which might be a laptop or other mobile computer) and a mobile device 103 (e.g., a smartphone such as an iPhone, Blackberry, Android, etc.) are connected by a network 101 (e.g., a wide area network (WAN) including the Internet, which might be wireless in part or in whole) with a website 104 hosting an online discussion.. In an example embodiment, the website 104 is composed of a number of servers connected by a network (e.g., a local area network (LAN) or a WAN) to each other in a cluster or other distributed system. The servers are also connected by a storage area network (SAN)) to persistent storage 105, which might include a redundant array of independent disks (RAID), in an example embodiment.

Personal computer 102 and the servers in website 104 might include (1) hardware consisting of one or more microprocessors (e.g., from the x86 family or the PowerPC family), volatile memory (e.g., RAM), and persistent storage (e.g., a hard drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family), volatile memory (e.g., RAM), and persistent storage (e.g., flash memory such as microSD) and (2) an operating system (e.g., Symbian OS, RIM BlackBerry OS, iPhone OS, Palm webOS, Windows Mobile, Android, Linux, etc.) that runs on the hardware.

Also in an example embodiment, personal computer 102 and mobile device 103 might each include a browser as an application program or part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and Palm webOS Browser. It will be appreciated that users of personal computer 102 and mobile device 103 might use browsers to communicate with the website software (e.g., social networking software, portal software, Internet forum software, message board software, Q&A software, etc.) running on the servers at website 104. Examples of website 104 include a website that is part of yahoo.com, amazon.com, yelp.com, facebook.com, and chow.com, among others.

Figure 2:
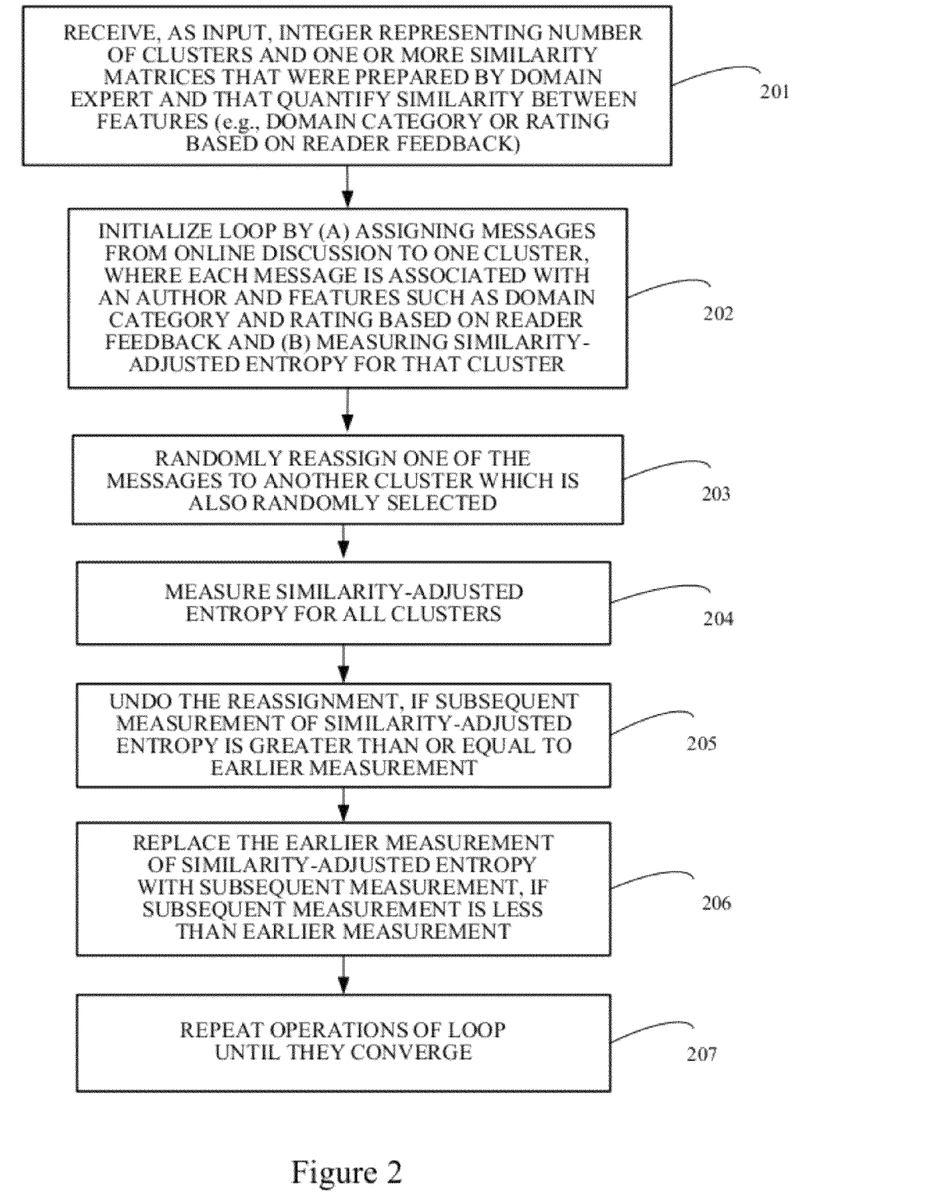
FIG. 2 is a flowchart diagram that illustrates a process for clustering with similarity-adjusted entropy, in accordance with an example embodiment.

FIG. 2 is a flowchart diagram that illustrates a process for clustering with similarity-adjusted entropy, in accordance with an example embodiment. This process might be performed by data-mining software running on a server at website 104 with access to data collections stored in persistent storage 105. In an example embodiment, those data collections might include messages from an online discussion. As depicted in FIG. 2, the data-mining software receives, as input (e.g., from a user of the data-mining software), an integer representing a number of clusters (e.g., 6, 7, or 8) and one or more similarity matrices that were prepared by a domain expert and that quantify similarity between features (e.g., domain category or rating based on user feedback), in operation 201. In an example embodiment, a user of the data-mining software might enter these inputs at a command-line interface, along with the name of a database file storing the messages from an online discussion. In an alternative example embodiment, a user of the data-mining software might enter these inputs and the name of such a database file at a graphical user interface (GUI). In operation 202, the data-mining software initializes a loop by: (A) assigning the messages from an online discussion to one cluster, where each message is associated with an author and features such as domain category and rating based on reader feedback; and (B) measuring similarity-adjusted entropy for that cluster. As will be discussed in further detail below, similarity-adjusted entropy is a generalization of "Shannon's entropy" as the term is used in information theory. (It will be appreciated that Shannon's entropy bears some resemblance to thermodynamic entropy, though they are distinct concepts.) In operation 203, the data-mining software randomly reassigns one of the messages to another cluster which is also randomly selected. In an example embodiment, the data-mining software might use iterative Monte Carlo methods/experiments to randomly assign reassign a message and/or randomly select a cluster, as described in T. Li, S. Ma, and M. Ogihara, Entropy-Based Criterion in Categorical Clustering, ICML '04: Proceedings of the Twenty-First International Conference on Machine Learning, page 68-75 (2004), which is incorporated herein by reference. However, in alternative example embodiments, other suitable stochastic processes/methods might be used.

In operation 204, the data-mining software measures similarity-adjusted entropy for all clusters. Then, in operation 205, the data-mining software undoes the reassignment, if the subsequent measurement of similarity-adjusted entropy (e.g., in operation 204) is greater than or equal to earlier measurement of similarity-adjusted entropy (e.g., during initialization in operation 202). In operation 206, the data-mining software replaces the earlier measurement of similarity-adjusted entropy with the subsequent measurement, if the subsequent measurement is less than the earlier measurement. And in operation 207, the data-mining software repeats the operations of loop (e.g., operations 203-206) until they converge. It will be appreciated that such convergence might occur when the loop operations repeatedly (e.g., following 10-30 iterations over the loop) result in relatively little or no change to similarity-adjusted entropy.

It will be appreciated that following convergence, the process might have located a local minimum with respect to similarity-adjusted entropy. If the number of messages and/or the number of features associated with each message is small enough, the local minimum might also be a global minimum with respect to similarity-adjusted entropy. Similarly, it will be appreciated that the process described in FIG. 2 might be performed off-line, in an example embodiment. However, here again, if the number of messages and/or the number of features associated with each message is small enough, the process might be performed online by a real-time or near real-time application which, for example, recommends authors of messages to participants in an online discussion. In such an example embodiment, the process might cause the recommended authors to be displayed by a browser in a graphical user interface (GUI) on a personal computer 102 and mobile device 103.

Figure 3A:
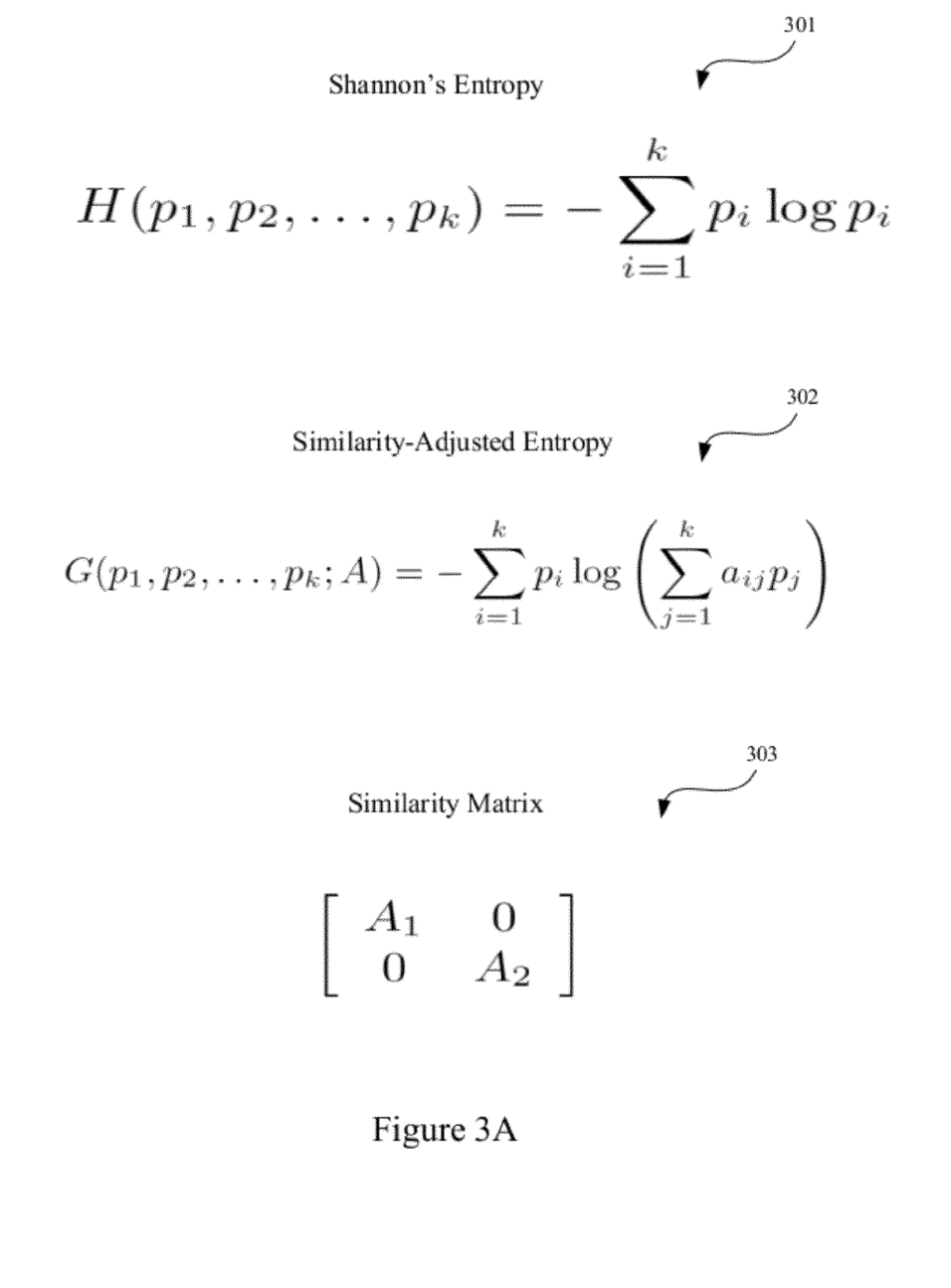
FIGS. 3A and 3B show mathematical formulas related to similarity-adjusted entropy, in accordance with an example embodiment.
Figure 3B:
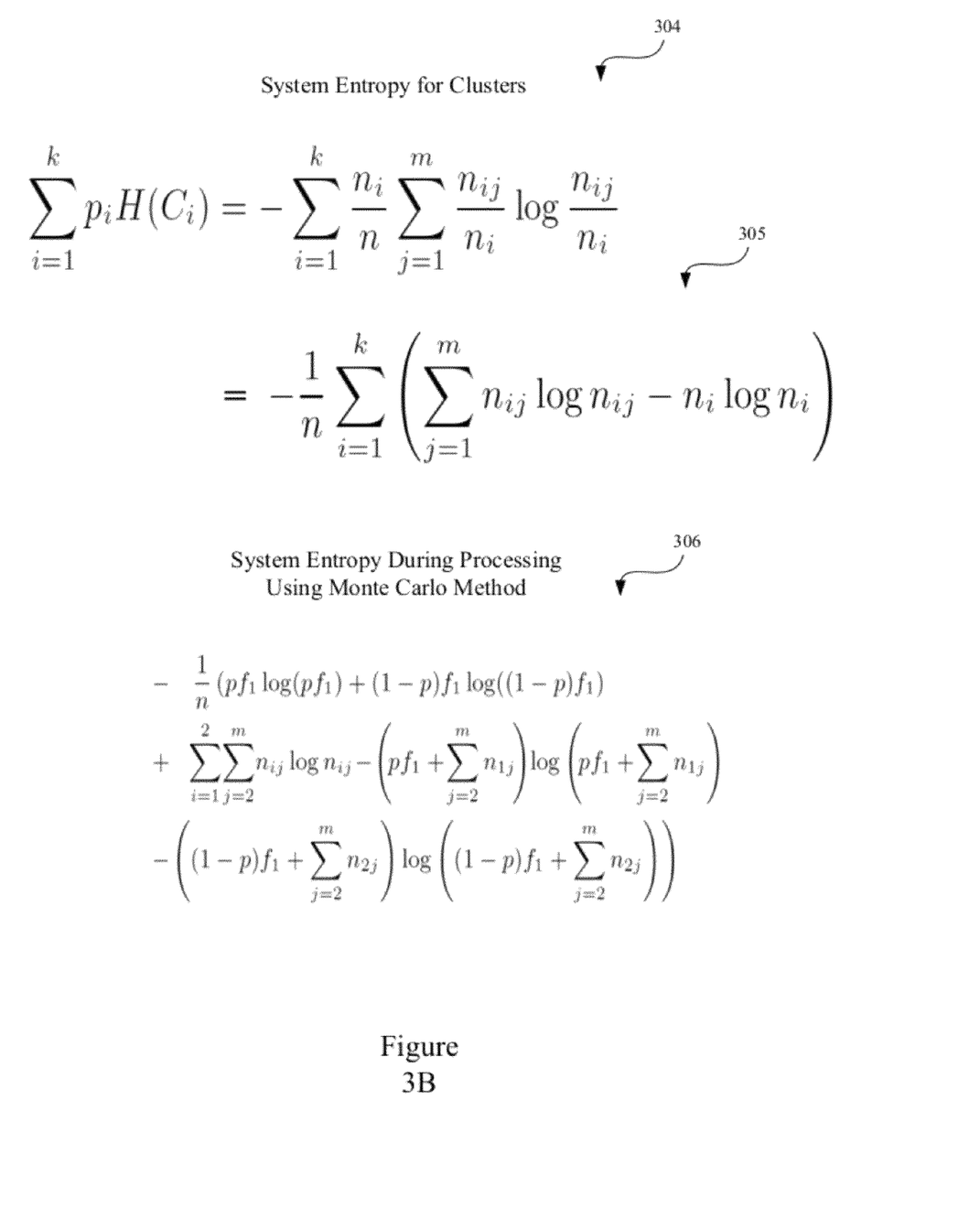

FIGS. 3A and 3B show mathematical formulas related to similarity-adjusted entropy, in accordance with an example embodiment. Shown in FIG. 3A is mathematical formula 301, which describes Shannon's entropy. As used in this formula, H is Shannon's entropy and it is a function of probabilities $p_1$ through $p_k$, more specifically, the negative summation from i equal 1 through k of $(p_i \cdot \log(p_i))$. In an example embodiment, the base of the log function might be 2, Euler's number e, 10, or any other suitable base.

Also shown in FIG. 3A is mathematical formula 302, which describes similarity-adjusted entropy. As used in this formula, G is similarity-adjusted entropy and it is a function of probabilities $p_1$ through $p_k$ and a similarity matrix A, more specifically, the negative summation from i equal 1 through k of ($p_i$·log(summation from j equal 1 to k of $a_{ij}$·$p_j$)). Here again, the base of the log function might be 2, Euler's number e, 10, or any other suitable base, in an example embodiment. FIG. 3A also shows an example similarity matrix 303, where $a_{ij}$=Sim($x_i$, $x_j$) and where Sim may be any similarity function producing values between 0 and 1. Examples of such similarity functions can be found in S. Santini and R. Jain, Similarity Measures, IEEE Transactions on Pattern Analysis and Machine Intelligence, 21(9):871-883 (September 1999), which is incorporated herein by reference.

Shown in FIG. 3B is a mathematical formula 304 for the system entropy after clustering n m-featured objects into k clusters, $C_1$ through $C_k$. As described in this formula, the system entropy is a summation from i equal 1 to k of $p_i$*H($C_i$) and is equal to the negative summation from i equal 1 through k of ($n_i$/n·(summation from j equal 1 to m of ($n_{ij}$/$n_i$·log($n_{ij}$/$n_i$)))), where $n_{ij}$ is the count of the jth feature in the ith cluster, $n_i$ is the summation from i equal 1 to m of $n_{ij}$ and is the size of $C_i$, and $p_i$ equals $n_i$/n. Mathematical formula 305 shows an equivalent description of such system entropy, where system entropy is a negative 1/n· the summation from i equal 1 through k of the summation from j equal 1 through m of ($n_{ij}$·log($n_{ij}$)−$n_{ij}$*log($n_i$)). It will be appreciated that mathematical formulas 304 and 305 are described in terms of Shannon's entropy, rather than similarity-adjusted entropy, though the formula can be easily modified to use the latter measure of entropy.

Also shown in FIG. 3B is the mathematical formula 306 showing the system entropy during the processing using Monte Carlo methods as described above. In this formula, $f_1$ equals the total count of feature 1 and n and m are as defined above, e.g., there are n m-featured objects. The mathematical formula 306 assumes that at some point in time during the processing the objects corresponding to feature 1 are divided between two clusters $C_1$ and $C_2$. At this point in time, $n_{11}$ equals p·$f_1$ and $n_{21}$ equals (1−p)*$f_1$, where p is the proportion of $f_1$ objects belonging to $C_1$. And system entropy, S(p), equals the following:

$$-\frac{1}{n}\left(pf_1 \log(pf_1) + (1-p)f_1 \log((1-p)f_1) + \sum_{i=1}^{2}\sum_{j=2}^{m} n_{ij}\log n_{ij} - \left(pf_1 + \sum_{j=2}^{m} n_{1j}\right)\log\left(pf_1 + \sum_{j=2}^{m} n_{1j}\right) - \left((1-p)f_1 + \sum_{j=2}^{m} n_{2j}\right)\log\left((1-p)f_1 + \sum_{j=2}^{m} n_{2j}\right)\right)$$

Here again, it will be appreciated that mathematical formula 306 is described in terms of Shannon's entropy, rather than similarity-adjusted entropy, though the formula can be easily modified to use the latter measure of entropy. Further, it will be appreciated that S(p) is a concave function of p, and consequently, that system entropy tends to be minimized only when all of the objects associated with feature 1 are contained in only one of $C_1$ or $C_2$. That is to say, mathematical formula 306 is a formalization of the intuition that the best clustering occurs when all similar or identical items are grouped together.

Figure 4A:
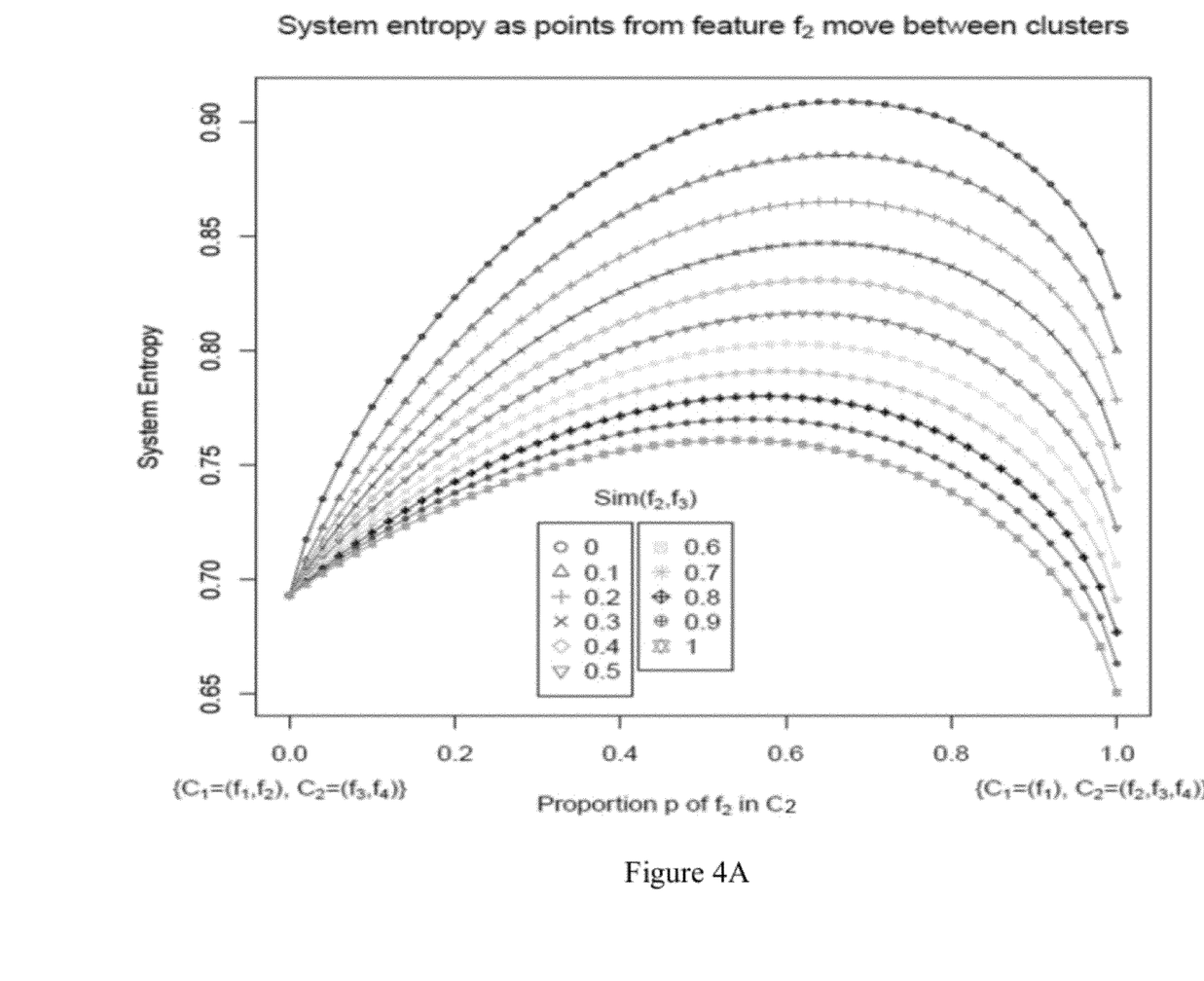
FIGS. 4A and 4B show plots of similarity-adjusted entropy for a system as objects with a particular feature are moved between clusters, in accordance with an example embodiment.
Figure 4B:
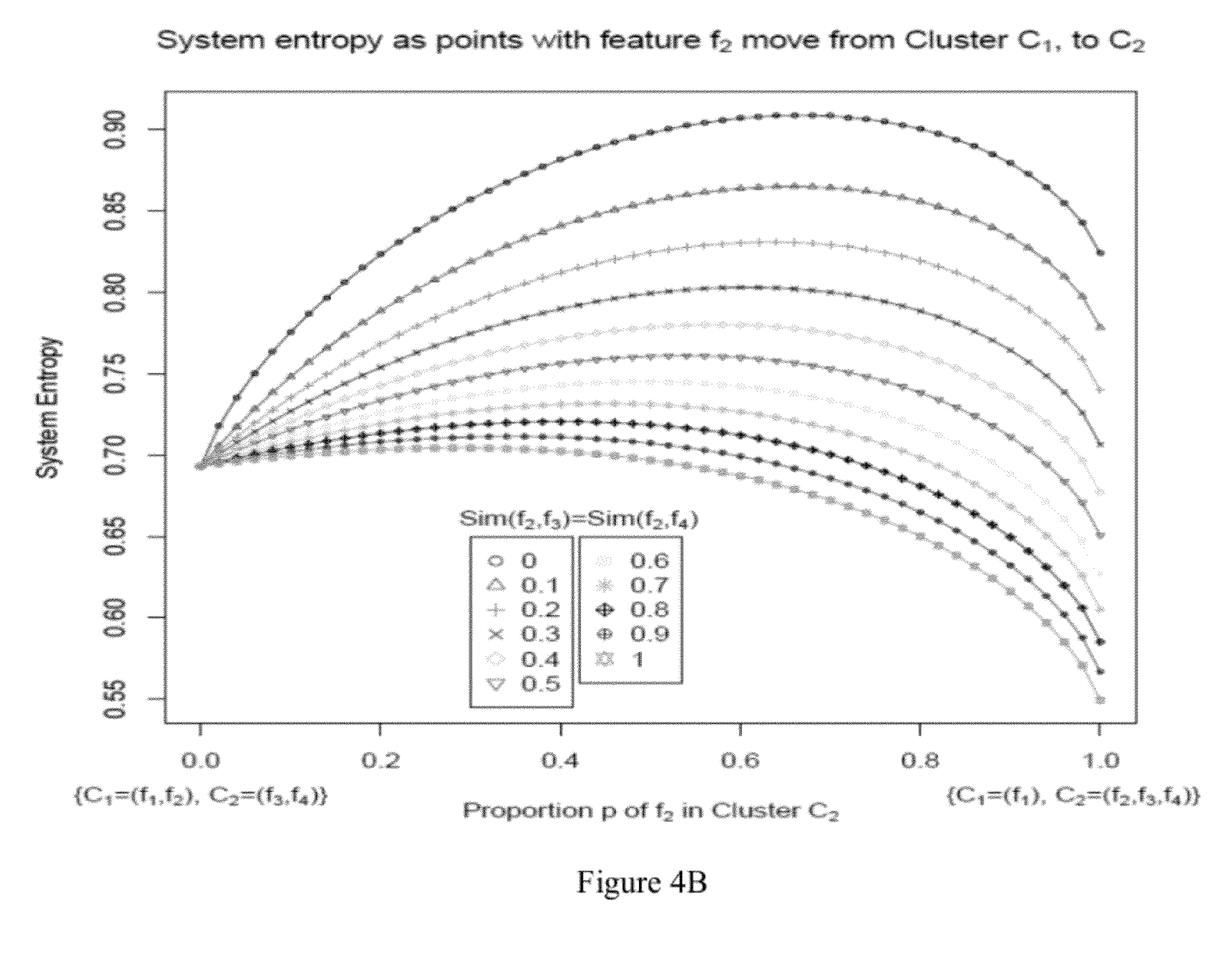

FIGS. 4A and 4B show plots of system entropy that has been similarity-adjusted, in accordance with an example embodiment. More specifically, FIG. 4A shows ten plots of system entropy as the dependent variable with respect to a concave function whose independent variable is the proportion of objects associated with feature 2 in $C_2$. Each of the ten plots is associated with a similarity matrix based on a similarity function (Sim) that quantifies the similarity between $f_2$ and $f_3$. In the topmost plot, Sim($f_2$,$f_3$) is 0. In the bottommost plot, Sim($f_2$,$f_3$) is 1. It will be appreciated that as the value for Sim($f_2$,$f_3$) increases, so does the likelihood that system entropy will be minimized when all of the objects associated with $f_2$ are in $C_2$, with all of the objects associated with $f_3$.

Similarly, FIG. 4B shows ten plots of system entropy as the dependent variable with respect to a concave function whose independent variable is the proportion of objects associated with feature 2 in $C_2$. Each of the ten plots is associated with a similarity matrix based on a similarity function (Sim) that quantifies the similarity between $f_2$ and $f_3$ and the similarity between $f_2$ and $f_4$; as shown in the figure's legend, Sim($f_2$,$f_3$) equals Sim($f_2$,$f_4$). In the topmost plot, Sim($f_2$,$f_3$) is 0, as is Sim($f_2$,$f_4$). In the bottommost plot, Sim($f_2$,$f_3$) is 1, as is S($f_2$, $f_4$). It will be appreciated that as the value for Sim($f_2$,$f_3$) and/or Sim($f_2$,$f_4$) increases, so does the likelihood that system entropy will be minimized when all of the objects associated with $f_2$ are in $C_2$, with all of the objects associated with $f_3$ and $f_4$.

It will be appreciated that the concave plots in FIGS. 4A and 4B disclose a potential problem with the Monte Carlo process described earlier. It is possible that such a process might encounter a local minimum that cannot be surmounted by moving a single object from one cluster to another cluster during an iteration. For example, if there are four features, each of which is equally frequent, and there are two clusters, the optimal clustering occurs when each of the two clusters contains all the objects corresponding to two of the four features. In this regard, see the topmost curve at p equal to 0.0 in FIGS. 4A and 4B. But since the plots are concave, it is possible that the system entropy does not monotonically increase or decrease as the clustering changes from one stable configuration to another. Thus, if the Monte Carlo process described above reaches the configuration {$C_1$=($f_1$), $C_2$=($f_2$; $f_3$; $f_4$)}, then it is impossible to reach the optimal configuration {$C_1$=($f_1$; $f_2$), $C_2$=($f_3$; $f_4$)} by making changes (e.g., by moving one object in an iteration) to the configuration.

One solution to the problem of local minima is to move all of the objects associated with a randomly selected feature to a randomly selected cluster. It will be appreciated that this solution can be used regardless of whether the object is an ordered pair or a vector. This solution is particularly apt for clustering answerers at a community Q&A website, since a large number of them might exhibit similar or identical behavior.

Figure 5A:
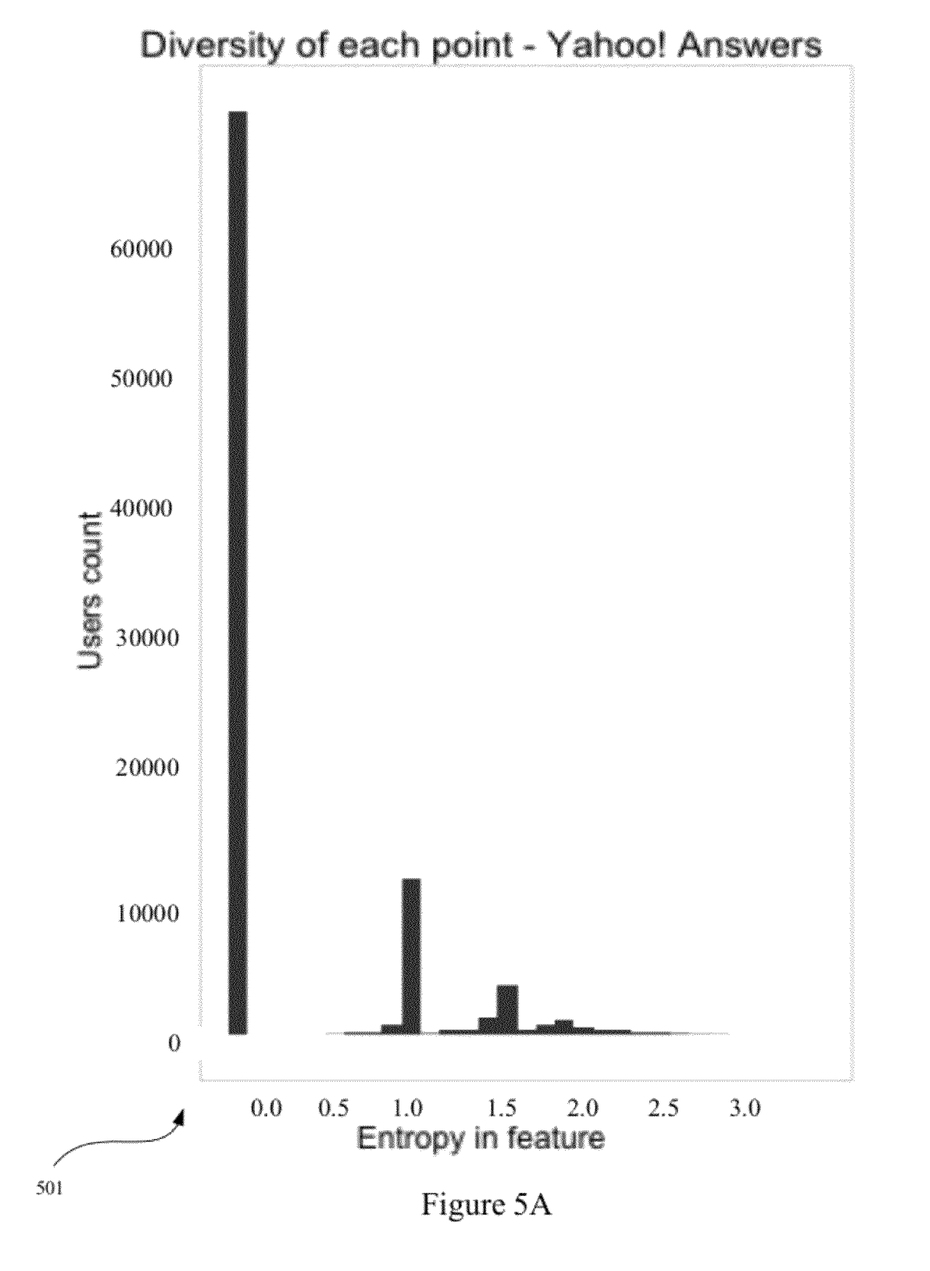
FIGS. 5A and 5B show histograms of entropy in features for a collection of data objects with respect to (a) answerers at community Q&A website and (b) with respect to plant species in the United States.
Figure 5B:
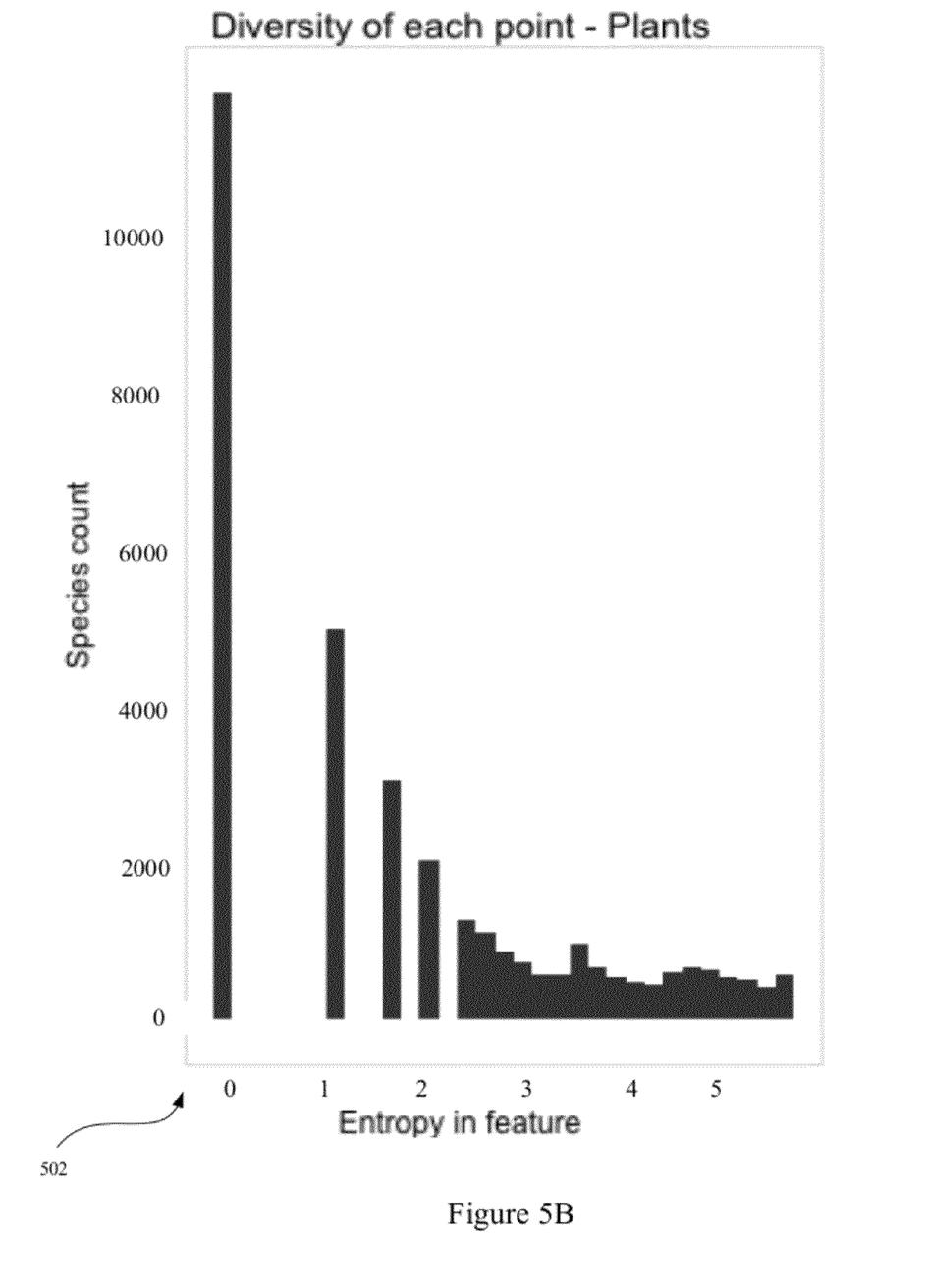

FIGS. 5A and 5B show histograms of entropy in features for a collection of data objects with respect to: (a) answerers at a community Q&A website; and (b) with respect to plant species in the United States. Collection (a) consisted of a snapshot of answers in four categories from Yahoo! Answers, during the time period from May 2006 to Aug 2009. The snapshot included 306,354 answers from 93,984 answerers. The four categories were: (1) Maintenance and Repairs; (2) Motorcycles; (3) Cameras, and (4) Cam-corders. Intuitively, categories 1 and 2 are somewhat similar, as are categories 3 and 4. Each of the answers was rated by the asker of the question on a scale from 1 to 5, with 5 being the highest rating. Thus, in collection (a) there were 20 features (4 categories ×5 ratings).

Collection (b) consisted of partial data from the United States Department of Agriculture (USDA) plants database, which associates a species with the states in the United States and Canada where the species grows. Collection (b) only included data for states in the United States. And that data was grouped, by a domain expert, into nine geographical regions: (1) New England; (2) Middle Atlantic; (3) East North Central; (4) West North Central; (5) South Atlantic; (6) East South Central; (7) West South Central; (8) Mountain; and (9) Pacific.

As shown in histogram 501 in FIG. 5A, the collection (a) shows relatively low entropy (or diversity) in its features, e.g., in the range from 0 to 2.5. This relatively low entropy results from the fact that most individual answerers answered questions in only one or a few of the four categories. By contrast, collection (b) shows relatively high entropy, e.g., in the range from 0 to 6.5, as shown in histogram 502 in FIG. 5B. This relatively high entropy results from the fact that many individual species grow in many of the nine regions.

Figure 6:
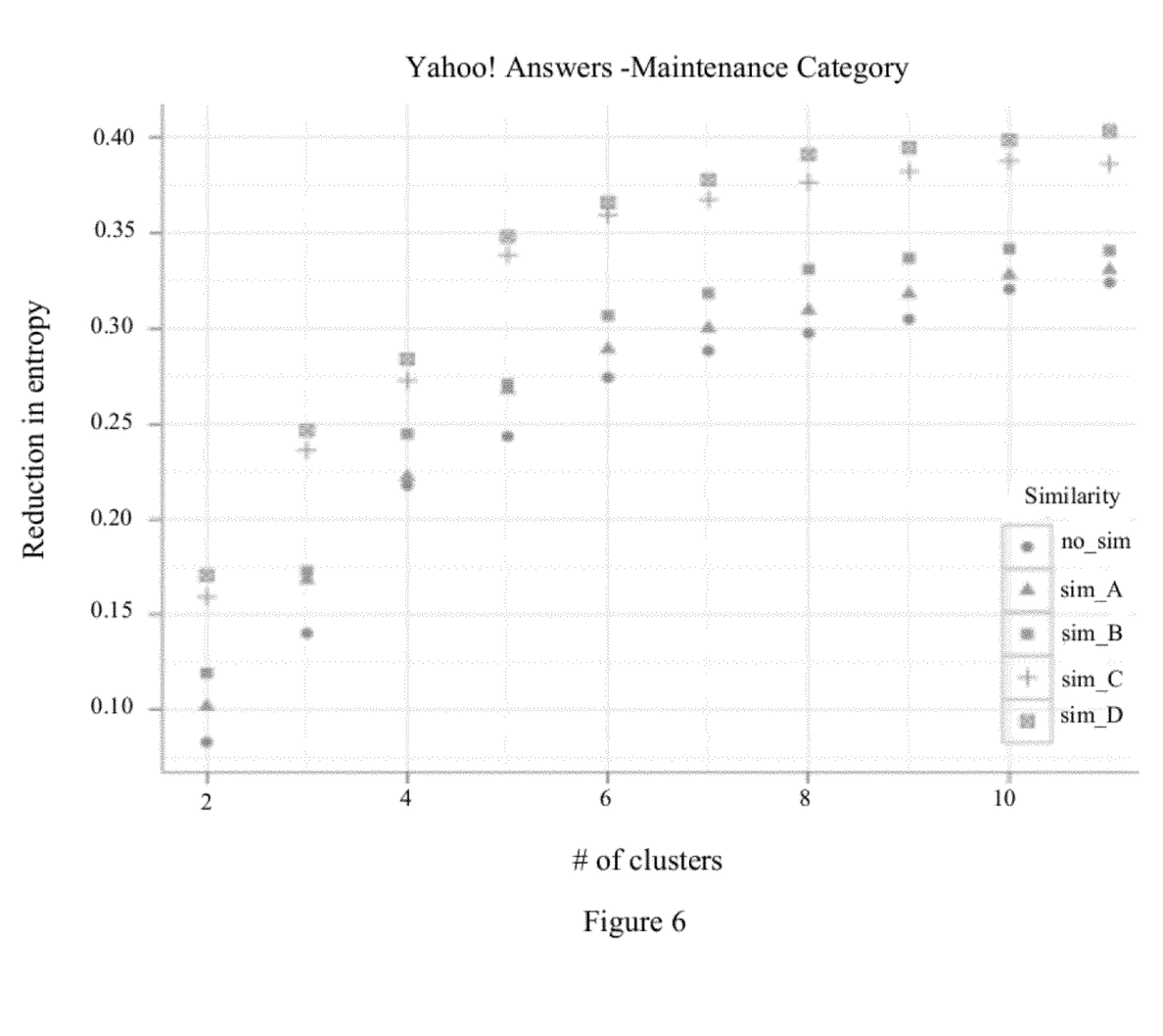
FIG. 6 shows a plot of the reduction in system entropy for various similarity matrices relating ratings for answerers at a community Q&A website, in accordance with an example embodiment.

FIG. 6 shows a plot of the reduction in system entropy for various similarity matrices relating ratings for answerers at a community Q&A website, in accordance with an example embodiment. As noted above the community Q&A website is Yahoo! Answers and the figure pertains to answerers in the Maintenance category. The legend on the figure describes five similarity cases: (1) no similarity matrix; (2) a similarity matrix A where the Sim(ratings 1 and 2) is 0.2, Sim(ratings 2 and 3) is 0.1, and Sim(ratings 3 and 4) is 0.3; (3) a similarity matrix B where the Sim(ratings 1 and 2) is 0.5, Sim(ratings 2 and 3) is 0.5, and Sim(ratings 3 and 4) is 0.5; (4) a similarity matrix C where the Sim(ratings 1 and 2) is 0.9, Sim(ratings 2 and 3) is 0.6, and Sim(ratings 3 and 4) is 0.9; and (4) a similarity matrix D where the Sim(ratings I and 2) is 1, Sim(ratings 2 and 3) is 0.5, and Sim(ratings 3 and 4) is 1. The reduction in system entropy is defined as $(S_0-S)/S_0$, where $S_0$ is the initial system entropy without any clustering.

As shown in the figure, the reduction in system entropy increases as the quantitative amount of similarity in the similarity matrix increases, regardless of the number of clusters. Likewise, as shown in this figure, the reduction in system entropy increases as the number of clusters increases, regardless of which similarity matrix is used.

Figure 7A:
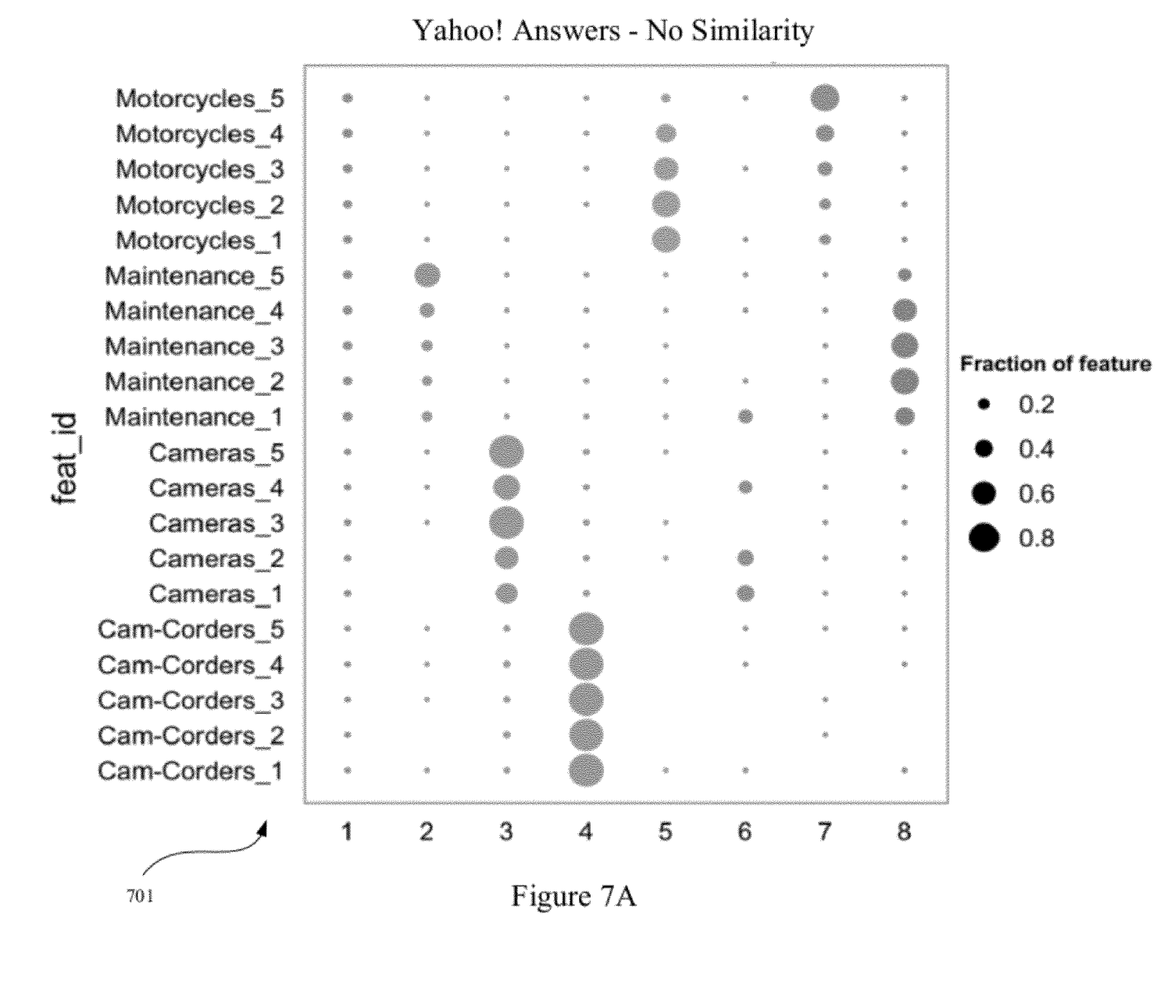
FIGS. 7A and 7B show the clusters of answerers at a community Q&A website that result from a process that employs system entropy that is similarity-adjusted, in accordance with an example embodiment.
Figure 7B:
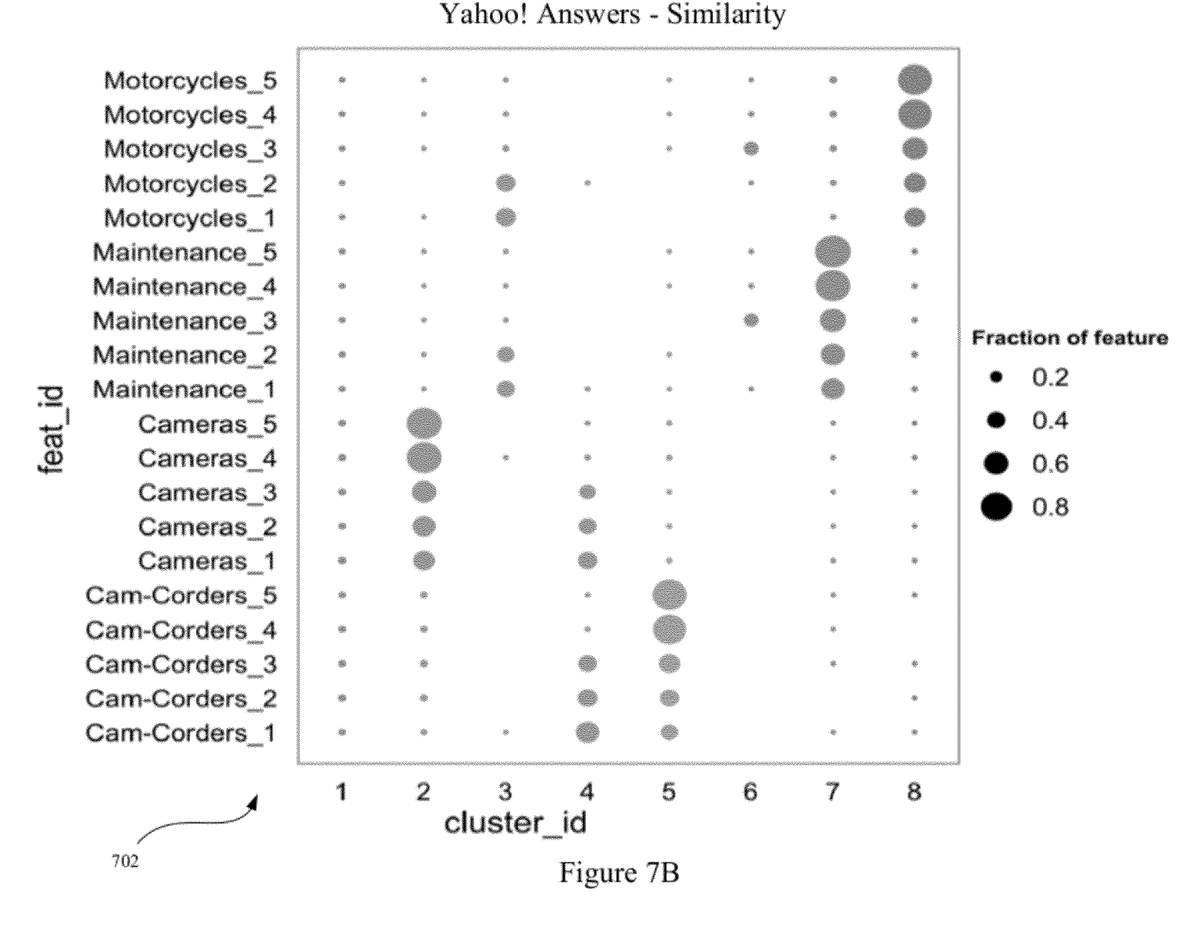

FIGS. 7A and 7B show the clusters of answerers at a community Q&A website that result from a process that employs system entropy that is similarity-adjusted, in accordance with an example embodiment. As noted above the community Q&A website is Yahoo! Answers. It will be appreciated that cluster ID is a randomly selected value with respect to the Monte Carlo process described above. Thus, cluster 2 in plot 701 in FIG. 7A might or might not be analogous to cluster 2 in plot 702 in FIG. 7B.

Plot 701 in FIG. 7A shows the clusters of answerers that result from convergence on low system entropy when the system entropy is not similarity-adjusted. As shown in this plot, a Monte Carlo process that uses only Shannon's entropy is effective at clustering the answerers by category. Thus, cluster 3 includes the vast majority of answerers in the Cameras category, regardless of the answerer's rating on a scale of 1 through 5. Likewise, cluster 4 includes the vast majority of answerers in the Cam-Corders category, regardless of the answerer's rating on a scale of 1 through 5, and cluster 8 includes the vast majority of answerers in the Maintenance category, regardless of the answerer's rating on a scale of 1 through 5. The answerers in the Motorcycle category ended up in two different clusters, 5 and 7, depending on whether the answerer's rating was low or high, respectively.

Plot 702 in FIG. 7B shows the clusters of answerers that result from convergence on low system entropy when the system entropy is adjusted using the following quantitative similarities, expressed using a Sim function, in a sparse similarity matrix: (1) Sim(ratings in Cameras and ratings in Cam-Corders) is 0.5; (2) Sim(ratings in Motorcycles and ratings in Maintenance) is 0.6; (3) Sim(ratings 1 and 2) is 0.9; (4) Sim(ratings 2 and 3) is 0.6; and (4) Sim(ratings 4 and 5) is 0.9. As shown in this plot, answerers are now clustered by rating in related categories. Thus, cluster 3 includes answerers in the Motorcycle and the Maintenance categories with low ratings. In relative terms, cluster 8 includes answerers in the Motorcycle category with high ratings and cluster 7 includes answerers in the Maintenance category with high ratings. Likewise, cluster 4 includes answerers in the Cameras and the Cam-Corders categories with low ratings. In relative terms, cluster 2 includes answerers in the Cameras category with high ratings and cluster 5 includes answerers in the Cam-Corders category with high ratings.

Figure 8A:
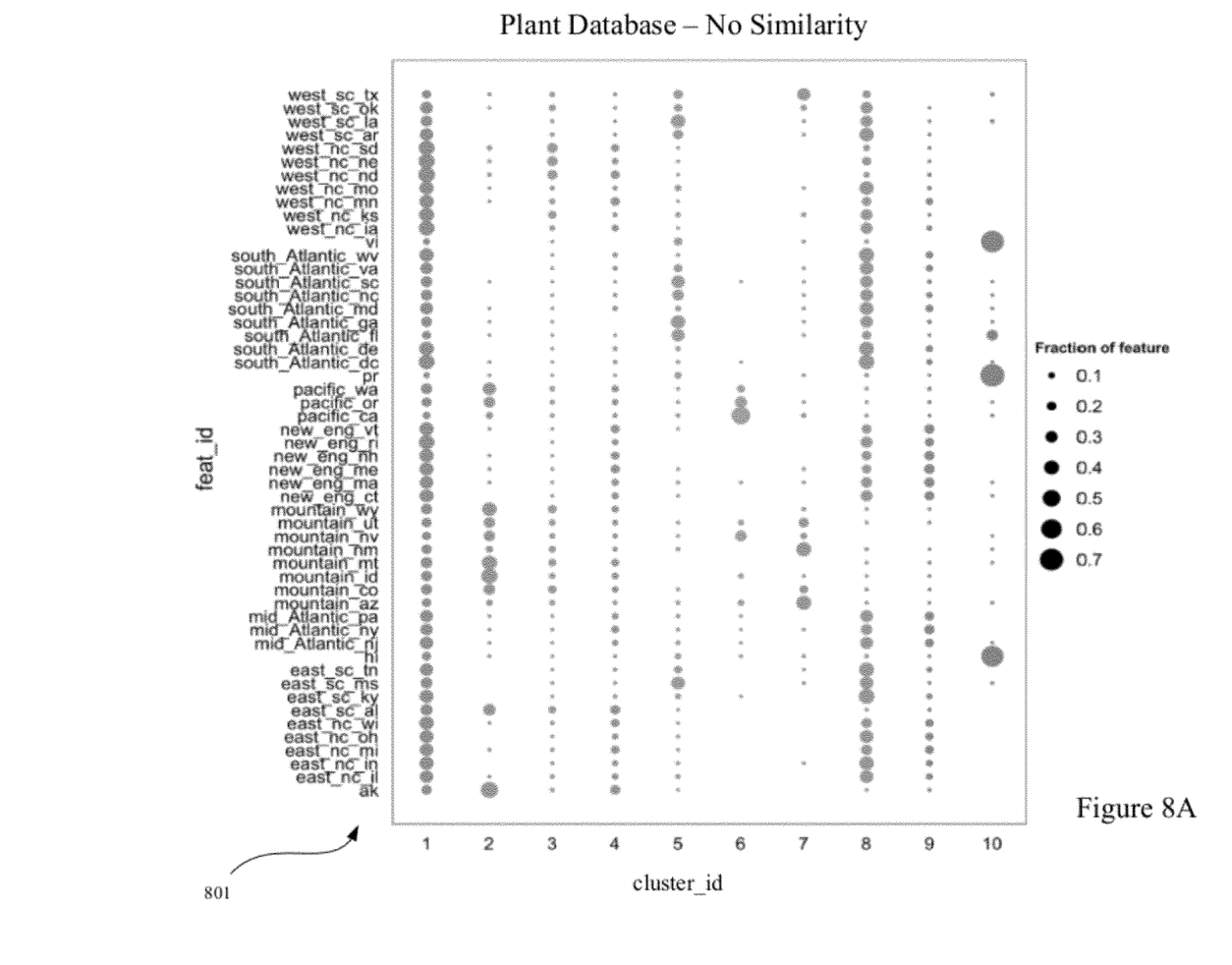
FIGS. 8A and 8B show the clusters of plants species in the United States that result from a process that employs system entropy that is similarity-adjusted, in accordance with an example embodiment.
Figure 8B:
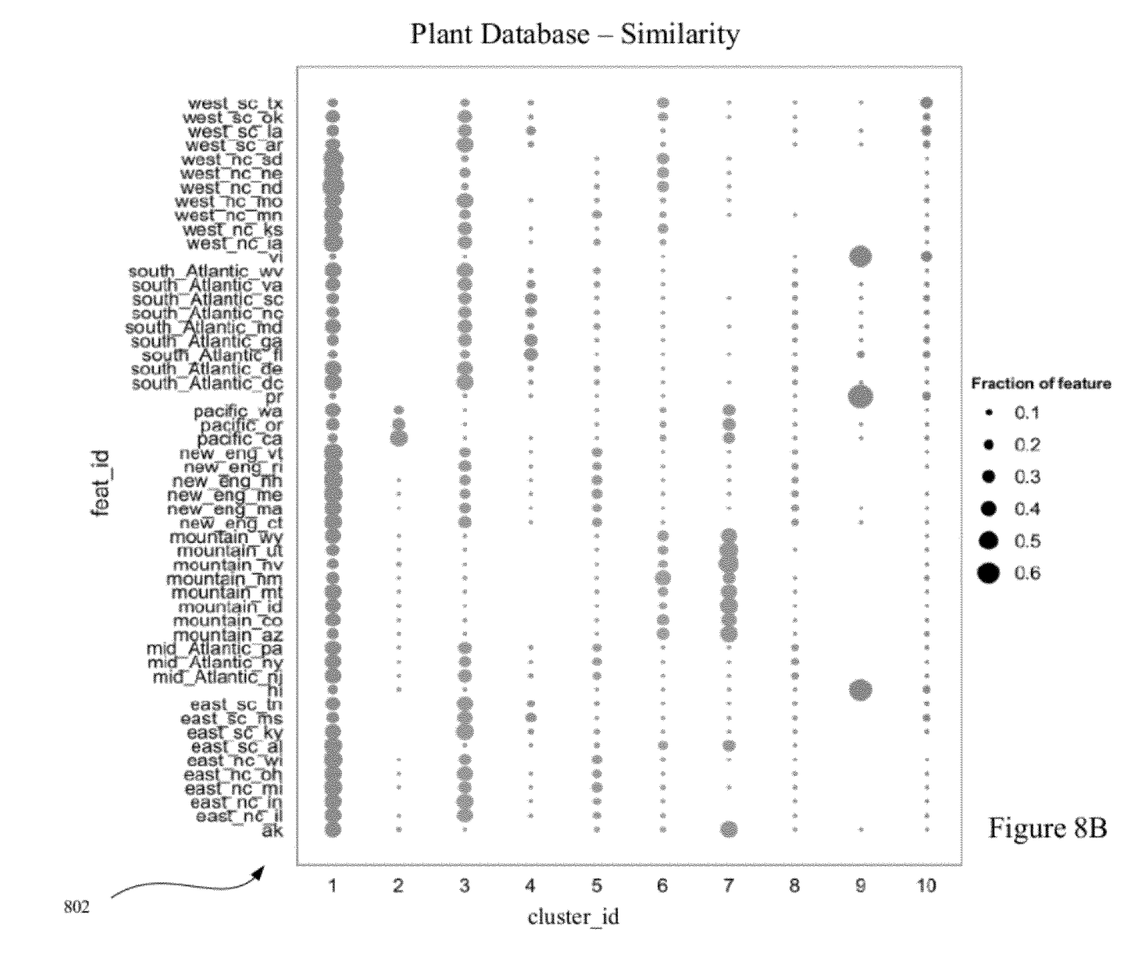

FIGS. 8A and 8B show the clusters of plants species in the United States that result from a process that employs system entropy that is similarity-adjusted, in accordance with an example embodiment. Here again, it will be appreciated that cluster ID is a randomly selected value with respect to the Monte Carlo process described above. Thus, cluster 8 in plot 801 in FIG. 8A might or might not be analogous to cluster 8 in plot 802 in FIG. 8B.

Plot 801 in FIG. 8A shows the clusters of plant species that result from convergence on low system entropy when the system entropy is not similarity-adjusted. As shown in this plot, a Monte Carlo process that uses only Shannon's entropy is somewhat effective at clustering the plants in geographically similar regions such as islands (cluster 10) and mountains (cluster 2). However, this clustering improved when the system entropy is adjusted using a similarity matrix where the quantitative similarity between states in the same region (e.g., Sim(states in same region)) is 0.9, as can be seen from the enhanced clustering of plants in cluster 2 (Pacific) and in cluster 7 (mountains) in Plot 802 in FIG. 8B.

It will be appreciated that a domain expert generated the similarity matrices used to adjust the system entropy in FIG. 6, Plot 702 in FIG. 7B, and Plot 802 in FIG. 8B. However, in an alternative example embodiment, the similarity matrix might be the result of an automated process. For example, states might be assigned to regions based on the longitude and/or latitude of each state, as determined from a database a global positioning system (GPS). Or alternatively, states might be assigned to a region based on the topology of each state, as determined from a database or GPS.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the invention have been described in some detail for purposes of clarity of understanding, it will be apparent that certain changes and modifications can be practiced within the scope of the following claims. For example, the operations described above might be used to cluster recommenders and/or products for purposes of a recommender system involving collaborative filtering. Alternatively, the operations described above might be used to cluster the results of drug trials where good results and very good results might be treated as quantitatively similar by a medical expert. In other example embodiments, the operations described above might be used to assign weights (or values with respect to importance) to particular features, rather than similarity between features. Moreover, the operations described above can be ordered, modularized, and/or distributed in any suitable way. Accordingly, the present embodiments are to be considered as illustrative and not restrictive, and the invention is not to be limited to the details given herein, but may be modified within the scope and equivalents of the following claims. In the following claims, elements and/or steps do not imply any particular order of operation, unless explicitly stated in the claims or implicitly required by the specification and/or drawings.

What is claimed is:

1. A method for clustering the authors of messages from a website for online discussion, comprising the operations of:
    initializing the method by assigning the messages to a first logical cluster that is one of a plurality of logical clusters, wherein each message is associated with an author, a category in a domain, and a rating based on feedback from readers of the message;
    determining a first measure of similarity-adjusted entropy for the plurality of logical clusters, wherein similarity-adjusted entropy is based at least in part on the category and the rating associated with each of the messages;
    randomly reassigning one of the messages to a second logical cluster, wherein the second logical cluster is randomly selected from the plurality of logical clusters;
    determining a second measure of similarity-adjusted entropy for the plurality of logical clusters;
    undoing the reassignment, if the second measure is greater than or equal to the first measure;
    replacing the first measure with the second measure, if the second measure is less than the first measure; and
    repeating all of the operations of the method following initialization until they converge, wherein each operation of the method is executed by a processor.

2. The method as in claim 1, wherein similarity-adjusted entropy is also based at least in part on a similarity matrix.

3. The method as in claim 2, wherein the similarity matrix is prepared by an expert with expertise in the domain.

4. The method as in claim 2, wherein the similarity matrix includes a non-zero value for one or more pairs of categories.

5. The method as in claim 2, wherein the similarity matrix includes a non-zero value for one or more pairs of ratings.

6. The method as in claim 1, wherein similarity-adjusted entropy is a generalization of Shannon's entropy.

7. The method as in claim 1, wherein the operations of the method are performed offline.

8. The method as in claim 1, wherein the operations of the method are performed approximately in real time.

9. The method as in claim 1 further comprising the operation of receiving an input establishing the number of logical clusters.

10. A computer-readable storage medium persistently storing a program, wherein the program, when executed, instructs a processor to perform the following operations:
    initialize a loop by assigning the messages to a first logical cluster that is one of a plurality of logical clusters, wherein each message is associated with an author, a category in a domain, and a rating based on feedback from readers of the message;
    determine a first measure of similarity-adjusted entropy for the plurality of logical clusters, wherein similarity-adjusted entropy is based at least in part on the category and the rating associated with each of the messages;
    randomly reassign one of the messages to a second logical cluster, wherein the second logical cluster is randomly selected from the plurality of logical clusters;
    determine a second measure of similarity-adjusted entropy for the plurality of logical clusters;
    undo the reassignment, if the second measure is greater than or equal to the first measure;
    replace the first measure with the second measure, if the second measure is less than the first measure; and
    repeat all of the operations of the loop until they converge.

11. The computer-readable storage medium as in claim 10, wherein similarity-adjusted entropy is also based at least in part on a similarity matrix.

12. The computer-readable storage medium as in claim 11, wherein the similarity matrix is prepared by an expert with expertise in the domain.

13. The computer-readable storage medium as in claim 11, wherein the similarity matrix includes a non-zero value for one or more pairs of categories.

14. The computer-readable storage medium as in claim 11, wherein the similarity matrix includes a non-zero value for one or more pairs of ratings.

15. The computer-readable storage medium as in claim 10, wherein similarity-adjusted entropy is a generalization of Shannon's entropy.

16. The computer-readable storage medium as in claim 10, wherein the operations of the program are performed offline.

17. The computer-readable storage medium as in claim 10 further comprising the operation of receiving an input establishing the number of logical clusters.

18. A method for clustering authors of messages from a website for online discussion, comprising the operations of:

using Monte Carlo experiments to assign the messages to a plurality of logical clusters until a convergence is reached as to a low similarity-adjusted entropy, wherein each message is associated with an author and features including a domain category and a rating based on feedback from readers of the message and wherein similarity-adjusted entropy is based at least in part on the domain category and the rating; and displaying, in a graphical user interface, each of the authors whose messages are assigned to the cluster associated with the highest ratings in each of the categories.

19. The method as in claim 18, wherein similarity-adjusted entropy is also based at least in part on a similarity matrix.

20. The method as in claim 19, wherein all the messages associated with a randomly selected feature are moved to a randomly selected cluster during one of the Monte Carlo experiments.

* * * * *